F. H. BEACH, Jr.
MILKING PAIL.
APPLICATION FILED MAR. 9, 1908.
930,720.
Patented Aug. 10, 1909.
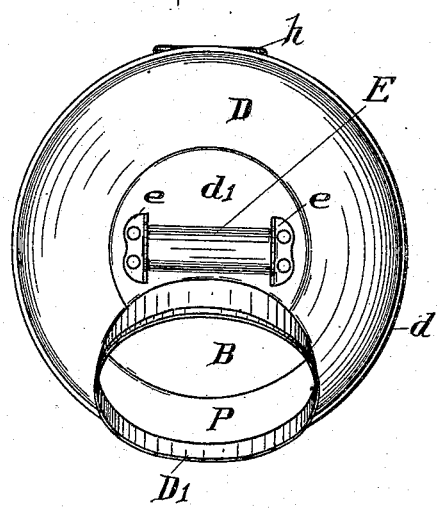
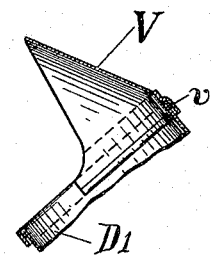
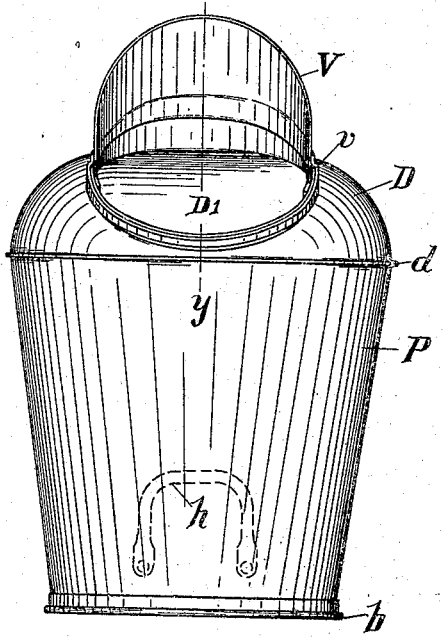
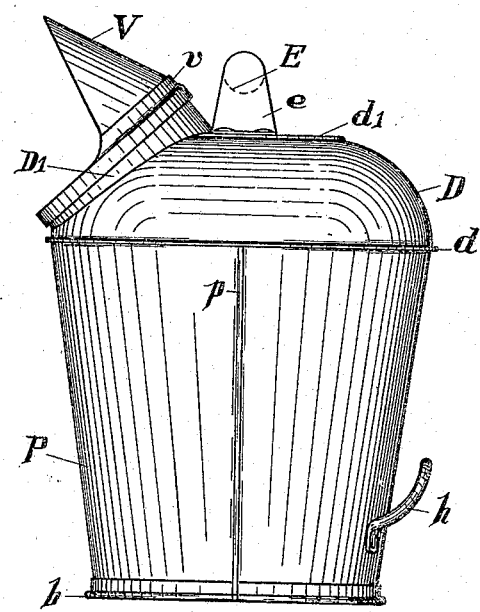
WITNESSES:
Osborne F. Gurney
Lottie Wood
INVENTOR:
Fred H. Beach, Jr.
By W. H. Cooley, Atty.

UNITED STATES PATENT OFFICE.

FRED H. BEACH, JR., OF ROCHESTER, NEW YORK.

MILKING-PAIL.

No. 930,720.　　　　Specification of Letters Patent.　　　Patented Aug. 10, 1909.

Application filed March 9, 1908. Serial No. 419,908.

*To all whom it may concern:*

Be it known that I, FRED H. BEACH, Jr., a citizen of the United States, and a resident of Rochester, in the county of Monroe and State of New York, have invented a new and Improved Milking-Pail, of which the following is a specification.

This invention relates to that class of pails or receptacles adapted to use as milking pails, the object being the economical production of a pail in which the entire interior and all the seams therein shall be visible from the orifice of the pail used when milking the cow; such an orifice may preferably be of elliptical conformation and with the minor axis of the ellipse disposed in a plane approximately vertical to the bottom of the pail and passing through the axis of the pail.

Another object of my invention is to provide such a pail having but a single orifice for use both in milking and for pouring and with such orifice formed in a top or canopy section conformed tangentially to the main side walls of the pail where it joins such side walls, in order that there may be no creases or angles at such joint for the lodgment of dirt or germs therein. I prefer that the top or canopy section be of approximately hemispherical conformation, except as to the opening provided therethrough and preferably also as to a small section at the center and top which may be flattened to facilitate the attachment of the handle, which I prefer to make use of in my milking pail.

In milking pails, as usually constructed, in the crease or angle, between the hood containing the usual pouring spout and the body of the pail, dirt and germs become lodged and such crease or angle being usually quite inaccessible and more or less at the side, it is difficult to clean. This difficulty is overcome by tangentially conforming the top at its junction to the side wall of the pail, that is, giving to the top such a curvature that where it joins the side wall of the pail such side wall is substantially tangential to the top or canopy.

By providing a single opening for pouring and milking, there is obviated the difficulty attendant upon and the necessity for cleaning out around the corners of a smaller opening or pouring spout, which is a serious objection on account of the tendency to the lodgment of dirt or germs in such corners and especially is this the case when a small pouring spout is used. Again, by giving to this single opening an elliptical conformation, the minor axis disposed in an approximately vertical plane passing through the axis of the pail, and by disposing the plane of the opening obliquely, I am enabled to greatly reduce the net area of the opening as projected upon a horizontal plane, thus materially reducing the area in which germs and dirt may fall during the process of milking.

As the result of tests in the use of a milk pail constructed in accordance with my present invention as compared with a milk pail of the usual style, the bacterial cultures have been reduced from eight million per cubic centimeter for the common pail when used with an ungroomed cow to sixty-nine thousand per cubic centimeter when a pail constructed in accordance with my invention was used under the same conditions.

I have found it desirable to employ with my milking pail a removable hood, the conformation of which is such that it practically covers vertically the milking orifice of the pail, as I have found that after using one of my pails for a short time without the hood one can readily then make use of the removable hood in such a way as to secure still better results in the exclusion of dirt and germs. I prefer to make the hood removable so that the user may become accustomed to the use of the pail without the hood, after which it requires much less time to become accustomed to the use of the pail with the hood which may preferably thereafter be used.

The accompanying drawings illustrating a milk pail constructed in accordance with my present invention are as follows:—

Figure 1 is a top view of the pail, Fig. 2 is a vertical sectional view of the removable hood taken along the line *x—y* of Fig. 3. Fig. 3 is a side view of the pail with the hood in place and with the milking orifice opening toward the observer, while Fig. 4 is a similar view but with the pail turned ninety degrees around, making the milking orifice open to the left.

Similar letters refer to similar parts throughout the several views.

Referring to the drawings,—my milk pail comprises the usual side walls P which at their upper edges are seamed and joined to the top or canopy section D at the seam *d*. The section D is so conformed that the side walls P are substantially tangential thereto at the point of their union in the seam $d$, and the seam $d$ extends outwardly so as to leave the pail practically smooth on the inside. Around the opening, preferably elliptical in form, in the top D there is secured a flange $D^1$ extending approximately at right angles to the plane of its outer end. The top or canopy section D may preferably be flattened for a short space, as seen at $d^1$, to receive the ears $e$ of the handle E. The side wall of the pail may be seamed, as seen at $p$ in Fig. 4, and on the outside there may be provided a suitable handle as seen at $h$. The bottom B of the pail may be secured therein the usual way and at the bottom of the pail there may be the usual reinforcing bead $b$.

Attention is called to the fact that there is but one orifice in the pail which is used as a milking and pouring orifice and provided with a short flange, the plane of the opening at the outer end of which is oblique to the axis of the pail in order to reduce to the minimum the net opening of the orifice as projected upon a horizontal plane. I have found that most users after having become accustomed to the pail as already described can quite readily become accustomed to the use of the removable hood which I shall now describe.

$v$ is a rim adapted to engage over the flange $D^1$ on the pail and has secured thereto the hood section V extending part way around and adapted to engage just inside of the upper portion of the flange $D^1$ and extend approximately half way around the same. The conformation of this hood section V is such that its outer edge extends substantially vertically over the outer edge of approximately the lower half of the flange $D^1$ in a way to fully protect the opening in the outer edge of the flange $D^1$ so that vertically falling particles or bodies cannot enter the pail through such opening.

I desire to call attention to the fact that with the hood V in place or removed, the entire inner surface of the pail is visible from the milking orifice so that one can readily see if there is any accumulation of dirt at any point in the pail. On account of the angular or oblique disposition of the opening in the flange D comprising the milking orifice, the net opening as vertically projected upon a horizontal plane is very materially reduced, thus reducing the net opening through which vertically falling bodies or particles may enter the pail. With the hood V in place, the opening in the pail is entirely protected against the ingress of dirt of any kind falling in vertical lines. The handle E comprises a cylindrical member securely soldered to the ears $e$, which in turn are riveted to the, preferably, flat section $d^1$ of the top piece D. By providing but one orifice to be used for both milking and pouring, the necessity for cleaning the usual small pouring orifice or spout is entirely removed.

It is believed from the foregoing description that the construction and method of using my milk pail are sufficiently clear to call for no further explanation herein.

What I claim is:—

1. In a milk pail, in combination with the bottom and side walls thereof, a top or canopy section extending uninterruptedly around and joined to the side walls of the pail, such top or canopy section conformed to extend substantially tangentially into the side walls.

2. In a milk pail, in combination with the bottom and side walls thereof, a top or canopy section extending around and joined to the side walls of the pail, such top or canopy section conformed to extend approximately tangentially into the side walls.

3. In a milk pail, in combination with the bottom and side walls thereof, a top or canopy section extending uninterruptedly around and joined to the top of the side walls of the pail, such top or canopy section conformed to extend substantially tangentially into the side walls and having a flattened portion at its top and a carrying handle secured to such top section at such flattened portion.

4. In a milk pail, in combination with the bottom and side walls thereof, a top or canopy section extending around and joined to the top of the side walls of the pail, such top or canopy section conformed to extend substantially tangentially into the side walls and having a flattened portion at its top and a carrying handle secured to such top section at such flattened portion.

5. In a milk pail, in combination with the bottom and side walls thereof, a top or canopy section extending uninterruptedly around and joined to the side walls of the pail, such top or canopy section conformed to extend substantially tangentially into the side walls and a combined milking opening and pouring spout in such top or canopy and near the joint between the same and the side walls of the pail, such milking opening and pouring spout having its orifice approximately in the form of an ellipse with its minor axis in a plane extending substantially through the axis of the pail.

6. In a milk pail, in combination with the bottom and side walls thereof, a top or canopy extending around and joined to the side walls of the pail, such top or canopy section conformed to extend substantially tangentially into the side walls and a combined milking opening and pouring spout in such top or canopy and near the joint between the same and the side walls of the pail, such milking opening and pouring spout having its orifice approximately in the form of an ellipse with its minor axis in a plane extending substantially through the axis of the pail.

7. In a milk pail, in combination with the bottom and side walls thereof, a top or canopy section extending uninterruptedly around and joined to the side walls of the pail, such top or canopy section conformed to extend substantially tangentially into the side walls; a combined milking opening and pouring spout in such top or canopy and near the joint between the same and the side walls of the pail, such milking opening and pouring spout having its opening arranged in a plane oblique to the axis of the pail whereby the net opening of such orifice as projected upon a plane at right angles to the axis of the pail is materially reduced.

8. In a milk pail, in combination with the bottom and side walls thereof, a top or canopy section extending around and joined to the side walls of the pail, such top or canopy section conformed to extend substantially tangentially into the side walls; a combined milking opening and pouring spout in such top or canopy and near the joint between the same and the side walls of the pail, such milking opening and pouring spout having its opening arranged in a plane oblique to the axis of the pail whereby the net opening of such orifice as projected upon a plane at right angles to the axis of the pail is materially reduced.

9. In a milk pail, in combination with the bottom and side walls thereof, a top or canopy section extending uninterruptedly around and joined to the top and side walls of the pail, such canopy or hood section conformed to extend substantially tangentially into the side walls; a combined milking opening and pouring spout in such hood or canopy and near the joint between the same and the side walls of the pail, such milking opening and pouring spout having its opening arranged in a plane oblique to the axis of the pail whereby the net opening of such orifice as projected upon a plane at right angles to the axis is materially reduced and a carrying handle secured to such top or canopy section substantially over the center of the pail, such handle comprising a tubular handle piece rigidly secured to connecting ears or lugs and such lugs secured to the top or canopy.

10. In a milk pail, in combination with the bottom and side walls thereof, a top or canopy section extending uninterruptedly around and joined to the side walls of the pail, such top or canopy section conformed to extend substantially tangentially into the side walls; a combined milking opening and pouring spout in such top or canopy and near the joint between the same and the side walls of the pail, such milking opening and pouring spout having its opening arranged in a plane oblique to the axis of the pail whereby the net opening of such orifice as projected upon a plane at right angles to the axis of the pail is materially reduced; a removable hood for such pouring spout adapted when in position to extend over the opening in such milking and pouring spout and prevent vertically falling bodies from entering such opening and means for removably securing such hood in such spout.

11. In a milk pail, in combination with the bottom and side walls thereof, a top or canopy section extending around and joined to the side walls of the pail, such top or canopy section conformed to extend substantially tangentially into the side walls; a combined milking opening and pouring spout in such top or canopy and near the joint between the same and the side walls of the pail, such milking opening and pouring spout having its opening arranged in a plane oblique to the axis of the pail whereby the net opening of such orifice as projected upon a plane at right angles to the axis of the pail is materially reduced; a removable hood for such pouring spout adapted when in position to extend over the opening in such milking and pouring spout and prevent vertically falling bodies from entering such opening and means for removably securing such hood in place in such spout.

12. In a milk pail, in combination with the bottom and side walls thereof, a top or canopy section extending uninterruptedly around and joined to the side walls of the pail, such top or canopy section conformed to extend substantially tangentially into the side walls and a combined milking opening and pouring spout in such top or canopy and near the joint between the same and the side walls of the pail.

13. In a milk pail, in combination with the bottom and side walls thereof, a top or canopy section extending around and joined to the side walls of the pail, such top or canopy section conformed to extend substantially tangentially into the side walls and a combined milking opening and pouring spout in such top or canopy and near the joint between the same and the side walls of the pail.

14. In a milk pail, in combination with the bottom and side walls thereof, a top or canopy section extending around and joined to the side walls of the pail, such top or canopy section conformed to extend substantially tangentially into the side walls; a combined milking opening and pouring spout in such top or canopy and near the joint between the same and the side walls of the pail, such milking opening and pouring spout having its opening arranged in a plane oblique to the axis of the pail whereby the net opening of such orifice as projected upon a plane at right angles to the axis of the pail is materially reduced, such milking opening and pouring spout so conformed and positioned that the entire inner surface of the pail is visible therethrough.

15. In a milk pail, in combination with the bottom and side walls thereof, a top or canopy section extending uninterruptedly around and joined to the top and side walls of the pail, such canopy or hood section conformed to extend substantially tangentially into the side walls; a combined milking opening and pouring spout in such hood or canopy and near the joint between the same and the side walls of the pail, such milking opening and pouring spout having its opening arranged in a plane oblique to the axis of the pail whereby the net opening of such orifice as projected upon a plane at right angles to the axis is materially reduced and a carrying handle secured to such top or canopy section substantially over the center of the pail, such handle comprising a tubular handle piece rigidly secured to connecting ears or lugs and such lugs secured to the top or canopy, such milking opening and pouring spout so conformed and positioned that the entire inner surface of the pail is visible therethrough.

16. In a milk pail, in combination with the bottom and side walls thereof, a top or canopy section extending uninterruptedly around and joined to the side walls of the pail, such top or canopy section conformed to extend substantially tangentially into the side walls; a combined milking opening and pouring spout in such top or canopy and near the joint between the same and the side walls of the pail, such milking opening and pouring spout having its opening arranged in a plane oblique to the axis of the pail whereby the net opening of such orifice as projected upon a plane at right angles to the axis of the pail is materially reduced; a removable hood for such pouring spout adapted when in position to extend over the opening in such milking and pouring spout and means for removably securing such hood in such spout, such milking opening and pouring spout so conformed and positioned that the entire inner surface of the pail is visible therethrough.

17. In a milk pail, in combination with the bottom and side walls thereof, a top or canopy section extending around and joined to the side walls of the pail, such top or canopy section conformed to extend substantially tangentially into the side walls; a combined milking opening and pouring spout in such top or canopy and near the joint between the same and the side walls of the pail, such milking opening and pouring spout having its opening arranged in a plane oblique to the axis of the pail whereby the net opening of such orifice as projected upon a plane at right angles to the axis of the pail is materially reduced; a removable hood for such pouring spout adapted when in position to extend over the opening in such milking and pouring spout and prevent vertically falling bodies from entering such opening and means for removably securing such hood in place in such spout, such milking opening and pouring spout so conformed and positioned that the entire inner surface of the pail is visible therethrough.

FRED H. BEACH, Jr.

Witnesses:
LOTTIE WOOD,
OSBORNE L. GURNEY.